Aug. 30, 1960 P. T. FARNSWORTH 2,951,113

COLOR TELEVISION RECEIVER

Filed May 27, 1954

INVENTOR.
PHILO T. FARNSWORTH

BY George A. Gust
ATTORNEY 2,951,113

COLOR TELEVISION RECEIVER

Philo T. Farnsworth, Fort Wayne, Ind., assignor to International Telephone and Telegraph Corporation Filed May 27, 1954, Ser. No. 432,830

5 Claims. (Cl. 178—5.4)

The present invention relates to color television and more particularly to a system for providing improved reproduction of images in substantially natural color.

According to a popular concept of transmitting color images, it is necessary that the colored televised object be divided into discrete areas of selected component colors of the object.

One generally accepted television system for accomplishing the transmission and reproduction of color television images from information which is so divided is characterized as the simultaneous system inasmuch as signals representing the red, blue and green color components of the subject matter are continuously transmitted in the form of one composite video signal, such signal being utilized by the receiver to transform this color information into a reproduction of the image.

A typical arrangement of the type contemplated by this invention is described in U.S. Patent #2,431,115, issued to Goldsmith on November 18, 1947, and in another U.S. Patent #2,545,325, issued to Weimer on March 13, 1951. Both of these patents propose a system comprising a picture tube having a phosphor reproducing screen composed of a plurality of parallel strip-areas, these strip-areas being divided into a plurality of repeating groups, the strip-areas of each group representing different component colors of the image. The strip-areas are of materials adapted to fluoresce upon electron impingement in each of the component colors. Means are provided to modulate the deflected electron beam in sequence under control of separate video signals equal in number to and representative of each of the selected component colors of the system to provide intensity control of the color response in each color. Other means are provided to limit the periods of active scan to coincide with the strip-areas of the screen, this means also serving as one part of a system to generate a series of control impulses which are out of phase with respect to each other by amounts corresponding to the spacing between said strip-areas. During active scanning of any particular strip-area, video signals representative of the color of that strip-area are applied to the beam to control production of a discrete area of the image.

The present invention differs in one respect from the disclosure of the two patents supra in the arrangement for limiting the active scan of the beam to the impinged strip-areas.

In view of the foregoing, it is an object of this invention to provide a unique and improved method and system for the reproduction of television images in substantially natural color.

Another object is to provide for reproduction of color television images by positively controlling the active scan periods of the scanning beam to coincide precisely with predetermined color producing areas of the image screen.

It is another object of this invention to provide a system for reproducing color television images by utilizing predetermined radiation from the image screen for developing a master impulse which is used to control sequentially active scanning of the various component color phosphors comprising the image screen, such radiation being relatively rapid in both its growth and decay.

It is still another object of this invention to provide in a color television receiver an image screen which contributes to the production of a train of synchronizing impulses which may be fed back to the electron beam for limiting the active scan to particular color phosphor areas of the screen.

According to this invention, a color television system is provided which comprises an image screen composed of a plurality of parallel strip-areas, said strip-areas being divided into a plurality of repeating groups, the strip-areas of each group representing different colors respectively with one strip-area representing non-visible radiation, an electron scanning beam for developing an image on said screen, electrode means for generating and controlling said beam, means for generating a gating impulse as said beam scans a location corresponding to one strip-area, delay means operatively coupled to said gating means and to said electrode means for providing successive delayed impulses corresponding to the spacing between said strip-areas whereby the delayed impulses may be utilized to control said beam as its scanning registers with respective successive strip-areas.

For a better understanding of the invention, together with other and further objects thereof, reference is made to the following description taken in connection with the accompanying drawing, and to the claims wherein the scope of the invention is claimed.

Figures 1, 2, 3:
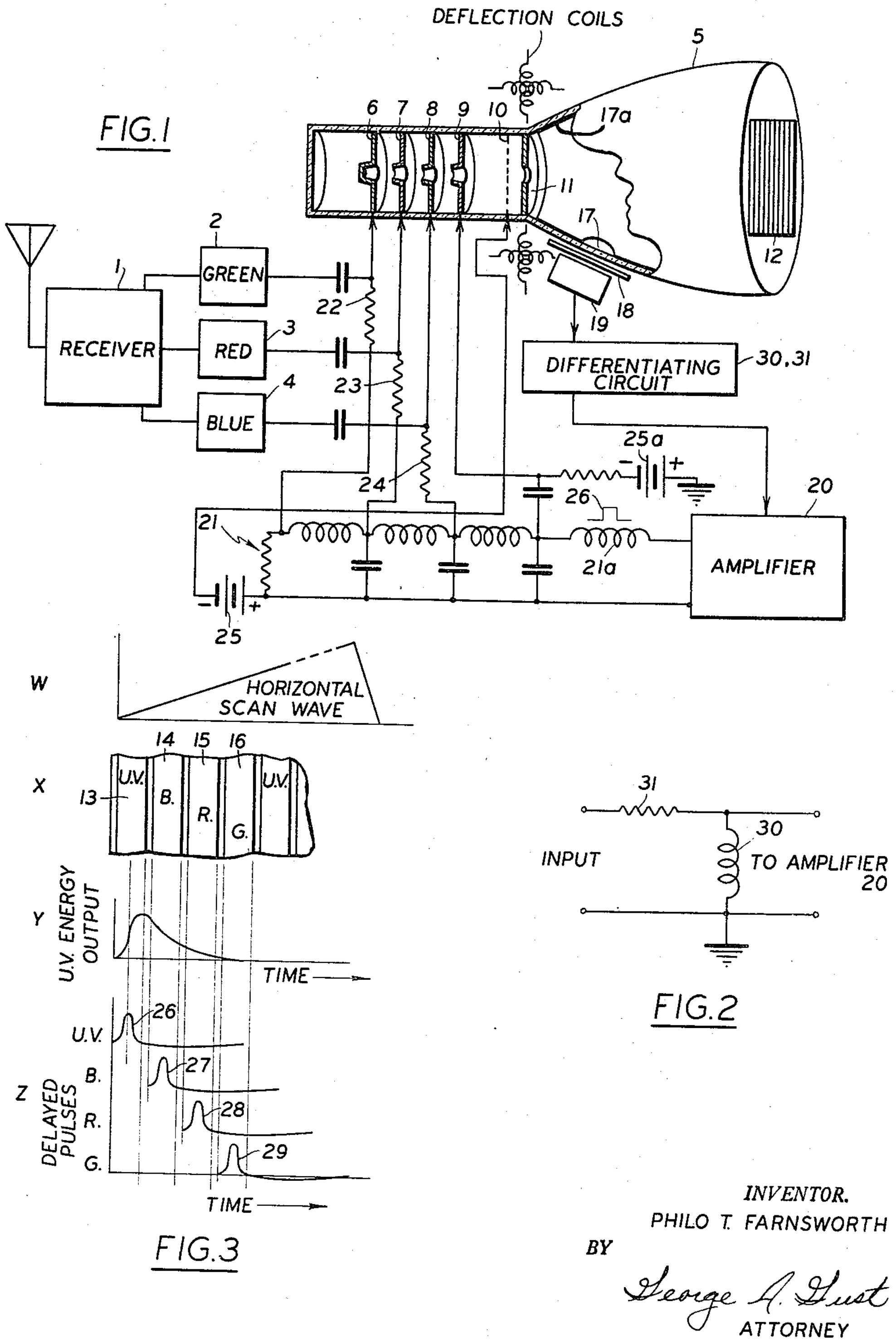
Fig. 1 is a diagram of one embodiment of this invention.
Fig. 2 is a circuit diagram of a differentiating network used in the arrangement of Fig. 1.
Fig. 3 is an illustration of wave forms used in explaining the operation of the invention.

Referring to the drawings, and more particularly to Fig. 1, only that portion of the receiver necessary to an understanding of this invention is illustrated, the remaining portions of the receiver being well-known to the art and either described or references provided in the aforementioned patent to Weimer. The receiver or block indicated by the reference numeral 1 supplies three different color circuits 2, 3 and 4, respectively, with green, red and blue video signal information, which in turn are operatively coupled to the electron gun of the picture tube 5. This electron gun includes a plurality of electron-emitting cathode electrodes 6, 7, 8 and 9, respectively. These cathodes are preferably formed as discs centrally extruded to provide the illustrated bosses. Cathode 6 is cup-shaped, while the remaining cathodes 7, 8 and 9 are annular and arranged coaxially in spaced relation with respect to cathode 6. The central extrusions or embossments of each of the cathodes are frusto-conical in shape with the internal surfaces provided with electron-emissive substances of any usual composition. Electrons emitted by cathode 6 will pass through the respective apertures of the other electrodes 7, 8 and 9 while the electrons issuing from any one of these latter electrodes will pass through the remaining electrode apertures. While this particular electron gun has been illustrated and will be described in connection with explaining an embodiment of this invention, it will be obvious to a person skilled in the art that the same type of gun and beam modulation as considered by the Weimer patent may also be used in connection with this invention.

Mounted in front of the cathode 9 is a conventional control grid 10, and spaced in front of this grid is the usual focusing and masking electrode 11. On the face of the tube 5 is in an image screen 12 which is formed of a plurality of vertically arranged parallel phosphor strips 13, 14, 15 and 16 (Fig. 3) preferably slightly spaced apart as illustrated. These respective strip-areas are composed of phosphor material which fluoresce in different component colors upon electron impact. The entire screen is arranged in groups of strip-areas, each group containing, in the order named, phosphor materials which fluoresce in ultra-violet, blue, red and green colors (Fig. 3).

Located toward the rear of the tube 5 and spaced a suitable distance from the screen 12 is a transparent window 17 which transmits ultra-violet radiation, this window being provided by omitting the usual conductive electrode coating 17*a*, such as aquadag, from a portion of the internal envelope surface as illustrated. A color filter 18 is mounted adjacent the window 17 and serves to exclude all colors with the exception of ultra-violet. A photomultiplier cell 19 is positioned to accept ultra-violet radiation from the filter 18 and provides a signal in response to excitation which is coupled to an impulse-shaping amplifier 20. The function of this amplifier 20 is to provide a negative impulse, after full amplification, of relatively short duration which corresponds to the time required for an electron beam to scan transversely one of the strip-areas of screen 12. The particular character of this impulse will be explained more fully in the following.

An impulse delay network, indicated generally by reference numeral 21, is coupled to the output circuit of the amplifier 20 and is operatively coupled to the various electrodes 6, 7, 8 and 9 through suitable coupling resistors 22, 23 and 24, respectively. A coupling capacitor is needed in the connection to the cathode 9 for separately biasing the latter. Suitable bias for the cathodes 6, 7 and 8 is provided by means of the battery 25, and bias for the cathode 9 is supplied by the battery 25*a*.

As will be noted from the diagram, the pulse delaying circuit 21 has three sections, one section for each of the cathodes 6, 7 and 8, respectively. The function of this circuit is to delay a master impulse 26 delivered by the amplifier 20 in successive steps such that each of the cathodes will receive an impulse of energy in predetermined spaced phase.

The tube 5 operates in a conventional manner with the electron gun which includes the various cathodes supplying the electrons comprising the scanning beam. Video information applied to the respective cathodes modulates the beam intensity for reproducing the image on the screen 12. The usual beam deflecting coils or the like are used for producing the usual scanning raster.

Considering now the operation, the three cathodes 6, 7 and 8 are normally biased below "cut-off" by the battery 25 and are gated or turned "on" by the impulses derived from the delay line 21. The cathode 9, however, is biased less to produce an electron beam which corresponds approximately to one-fourth of its full beam intensity. The battery 25*a* supplies this reduced bias. It should be understood that this reduced current beam is produced only during "no-signal" conditions; i.e., during the period no impulses 26 are being generated. Thus, as the scanning beam approaches strip 13, a small intensity is available for exciting the phosphor on strip 13 as will be more fully explained hereafter. During impulse generation, however, the cathode 9 is driven negative so as greatly to enhance its emission as long as the beam hits strip 13. Thereafter, the impulse decays quickly, as will become apparent from the following, and the bias will again be that determined by battery 25*a*.

As the electron beam scans horizontally, the color strip-areas will be traversed and will produce the respective colors upon beam impact. Thus, as the beam impinges the ultra-violet strip (Fig. 3), a spot of ultra-violet radiation will be produced. Similarly, blue, red and green spots will result from the beam traversing the respective strip-areas 14, 15 and 16. As is well understood, a single group of blue, red and green strips compose a single discrete image area in color, this method of reproducing elemental image color areas being explained in the aforementioned Weimer patent and the references designated therein.

As the scanning beam strikes the ultra-violet strip 13, the resulting radiation is detected by the photomultiplier 19 which generates an impulse of energy which is amplified by the amplifier 20. The impulse 26 derived from the amplifier 20 is first fed through delay section 21*a* of line 21 to the cathode 9 in such polarity (negative in the illustrated embodiment) as to increase electron emission therefrom. The photomultiplier 19 responds thereto to generate a corresponding impulse of increased amplitude which is amplified as before and fed to cathode 9 with a delay as determined by the element 21*a*. This delay is chosen such that the impulse appears on cathode 9 at the time when the beam hits the next succeeding strip corresponding to strip 13. As is now apparent, this operation is regenerative and results in rapid build-up of beam intensity and ultimate impulse 26 amplitude, the resulting regenerated impulse being indicated by the reference numeral 26 in graph Z as coinciding essentially with the middle portion of the ultraviolet strip 13.

The master impulse 26 is fed through one portion of the delay line 21 and applied to the cathode 8. This delayed impulse is indicated by the reference numeral 27 in the wave forms Z and, as will be noted in Fig. 3, coincides with scanning beam impingement on the blue strip 14. This impulse 27 keys the cathode 8 to "on" condition (electron emissive) which lasts only for the duration of the impulse.

The delay line further provides two additional impulses 28 and 29 sequentially delayed to coincide with beam impingement of the red and green phosphor strips, respectively, the impulse 28 being applied to cathode 7 and the impulse 29 to the cathode 6. The separated color information of the circuits 2, 3 and 4 being coupled to the respective cathodes 6, 7 and 8, as shown, such color information as supplied by these circuits will affect the electron emission from the respective cathodes only at the time the various impulses 27, 28 and 29 are applied thereto.

It may now be generalized that the three color signals contained in the usual color circuits 2, 3 and 4 are applied to the picture tube gun continuously, the color image being produced by gating the cathodes in time alternation. The three guns are normally "cut-off" and are gated "on" by the respective delayed impulses; i.e., the blue cathode is gated "on" immediately after the beam passes the ultra-violet strip, the red cathode an instant later when the beam has traversed to the red strip, and the green cathode when the beam coincides with the green strip.

During the time each cathode is "on," it will emit corresponding to the color information applied to it from block 2, 3 or 4, respectively, in Fig. 1. This emission will result in a spot of the correct intensity and color because each cathode is "on" only when the beam registers with this color. Superimposed on the image will be ultraviolet flashes from the fourth strip, which are not visible to the eye and thus do not disturb the image as seen by the observer.

It will now be evident that no problem of registering the guns and the phosphor strips exists. If the distances between or widths of the groups are not constant, or if the horizontal scanning saw-tooth is not linear (wave form W), the impulses appearing at the output of the amplifier 20 will similarly vary and cause the cathodes to follow this non-linearity; and as each of the master impulses effects only the spot appearance on the next three strips, no accumulation of scanning registration errors between groups can occur.

One particular reason for using an ultraviolet phosphor for generating the master gating impulse is that such phosphor in known compositions possesses both rapid growth and decay times which facilitate the almost instantaneous production of the necessary gating impulses for controlling the "on-off" time of the beam as it scans the succeeding color strips. Knowing the growth and decay characteristics of the ultraviolet phosphor, the width of one group of strips may be calculated for a given rate of horizontal scansion. In making this calculation, the sum of the growth and decay times should be slightly less than the time required for the beam to completely scan a single group of strips. Thus, the circuit (including photomultiplier 19) has time within which to become stabilized at a zero or reference level awaiting the next initiating master impulse produced by the beam striking the next succeeding ultraviolet strip. Thus is guaranteed a synchronizing impulse of proper amplitude and duration for each group of strips as the beam scans thereacross.

Should it be desired to use a simple two element photoelectric tube instead of the photomultiplier 19, more thermionic amplification will be necessary and it is then possible to insert additional pulse shaping or differentiating means in the several stages of amplification so that phosphors having longer decay periods may be used provided they have the rapid growth characteristic as described above. It is, however, preferable that this decay time be no longer than the time required for scanning a single horizontal line. Each time the beam strikes a signal strip composed of this phosphor, an impulse of radiation is produced and detected by the phototube. Corresponding electrical impulses are produced as before. These impulses are differentiated by means of any well-known differentiating circuit to produce a suitable train of impulses for amplification by amplifier 20. The succeeding phases of operation will thereafter be the same as explained hereinabove.

Referring now to the illustrated embodiment which includes photomultiplier 19, the phosphor having a rapid growth time, as illustrated by wave form Y of Fig. 3, an impulse of substantial amplitude is generated by the photomultiplier during the very short period of time the beam is in registry with the ultraviolet strip. By use of a differentiating circuit coupled between cell 19 and amplifier 20, as illustrated in Fig. 2, the rise or growth time of the phosphor may be differentiated into a sharp impulse 26 which coincides principally with the median portion of the ultraviolet strip. Combining the effects of the rapid response of the ultraviolet phosphor with the regenerative or feed-back operation previously described, the master impulse 26 may be almost instantaneously produced to have a sufficient amplitude for keying the remaining color cathodes 6, 7 and 8 "on" in their respective orders. While any particular differentiating circuit may be used, the one of Fig. 2 wherein the impedance of inductance 30 is appreciably smaller than the resistance 31 provides a suitable impedance match for the low impedance output of the photomultiplier 19. This photomultiplier may be of the conventional type 931A currently available on the open market.

While there has been described what is at present considered the preferred embodiment of the invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. In a color television receiver, means for reproducing a color image comprising an image screen composed of a plurality of parallel strip-areas, said strip-areas being divided into a plurality of repeating groups, the strip-areas of each group representing different colors respectively, electrode means for generating and controlling an electron scanning beam for developing an image on said screen, feedback means responsive to the radiation of one strip-area for generating a sharp negative gating pulse; said feedback means being a regenerative loop including said electrode means, the electron beam issuing from said electrode means, and said one strip-area, said loop further including amplifier means providing a negative-going impulse responsive to the radiation of said one strip-area for increasing the intensity of said electron beam; and means operatively coupled to said amplifier and to said electrode means and responsive to said amplifier impulse for providing successive negative impulses corresponding to the spacing between said strip-areas for successively turning said beam on and off as its scanning registers with respective successive strip-areas.

2. In a color television receiver, means for reproducing a color image comprising an image screen composed of a plurality of parallel strip-areas, said strip-areas being divided into a plurality of repeating groups, the strip-areas of each group representing different colors respectively, electrode means for generating and controlling an electron scanning beam for developing an image on said screen, feedback means responsive to the radiation of one strip-area for generating a sharp negative gating pulse, said feedback means being a regenerative loop which includes said electrode means, the electron beam issuing from said electrode means, said one strip-area, a radiation sensitive device which produces a pulse in response to the radiation of said one strip-area, and an operative connection including an amplifier between said radiation device and said electrode means which serves in supplying a negative-going impulse of energy to increase the intensity of said beam as the radiation of said one strip-area increases; and means operatively coupled to said amplifier and to said electrode means and responsive to said amplifier impulse for providing successive negative impulses corresponding to the spacing between said strip-areas whereby the said beam is successively turned on and off as its scanning registers with respective successive strip-areas.

3. In a color television receiver, means for reproducing a color image comprising an image screen composed of a plurality of parallel strip-areas, said strip-areas being divided into a plurality of repeating groups, the strip-areas of each group representing different colors respectively, electrode means for generating and controlling an electron scanning beam for developing an image on said screen, feedback means responsive to the radiation of one strip-area for generating a sharp negative gating pulse, said feedback means being a regenerative loop which includes said electrode means, the electron beam issuing from said electrode means, said one strip-area, a radiation sensitive device which produces a pulse in response to the radiation of said one strip-area, and an operative connection including an amplifier between said radiation device and said electrode means which serves in supplying a negative-going impulse of energy to increase the intensity of said beam as the radiation of said one strip-area increases; said electrode means including modulating elements for supplying image information to said electron beam, and delay means operatively coupled to said amplifier and to said modulating elements and responsive to said amplifier impulse for providing successive negative impulses corresponding to the spacing between strip-areas, said delayed impulses respectively energizing said modulator elements to key said electron beam on and off for each strip-area; and means normally biasing said modulation elements "off" in the absence of a said delayed pulse.

4. In a color television receiver, means for reproducing a color image comprising an image screen composed of a plurality of parallel strip-areas, said strip-areas being divided into a plurality of repeating groups, the strip-areas of each group representing different colors respectively, electrode means for generating and controlling an electron scanning beam for developing an image on said screen, said electrode means comprising a plurality of electron-emissive elements there being one element for each strip-area of one group, feedback means responsive to the radiation of one strip-area for generating a sharp negative gating impulse; said feedback means being a regenerative loop which includes one electron-emissive element, the electron beam issuing from said one element, said one strip-area, a radiation sensitive device which produces an impulse in response to the radiation of said one strip-area, and an operative coupling including an amplifier between said radiation device and said one electron-emissive element which serves to provide a negative-going impulse for increasing the intensity of electron emission from said one element in accordance with the increase in radiation intensity from said one strip-area; delay means operatively coupled to said amplifier and to respective ones of the other of said electron emissive elements and responsive to said amplifier impulse for providing successive negative impulses corresponding to the spacing between strip-areas, said delayed impulses being coupled to respective ones of the other of said electron-emissive elements in such a manner as to permit electron emission from said elements only during the occurrence of the respective delayed impulse; and means for normally biasing said other electron-emissive elements "off" in the absence of a said delayed pulse.

5. In a color television receiver, means for reproducing a color image comprising an image screen composed of a plurality of parallel strip-areas, said strip-areas being divided into a plurality of repeating groups, the strip-areas of each group representing different colors respectively, electrode means for generating and controlling an electron scanning beam for developing an image on said screen, said electrode means comprising a plurality of electron-emissive elements, there being one element for each strip-area of one group, feedback means responsive to the radiation of one strip-area for generating a sharp negative gating impulse; said feedback means being a regenerative loop which includes one electron-emissive element, the electron beam issuing from said one element, said one strip-area, a radiation sensitive device which produces an impulse in response to the radiation of said one strip-area, and an operative coupling including an amplifier between said radiation device and said one electron-emissive element which serves to provide a negative-going impulse for increasing the intensity of electron emission from said one element in accordance with the increase in radiation intensity from said one strip-area; delay means operatively coupled to said amplifier and to respective ones of the other of said electron-emissive elements and responsive to said amplifier impulses for providing successive negative impulses corresponding to the spacing between strip-areas, said delayed impulses being coupled to said respective ones of the other of said electron-emissive elements in such a manner as to permit electron emission from said elements only during the occurrence of the respective delayed impulse, means normally biasing said other electron-emissive elements "off" in the absence of a said delayed pulse, and means for respectively applying different color signals to said other of said electron-emissive elements thereby to apply image information to said beam for reproducing an image on said screen.

References Cited in the file of this patent

UNITED STATES PATENTS

| | | |
|---|---|---|
| 2,633,547 | Law | Mar. 31, 1953 |
| 2,635,141 | Bedford | Apr. 14, 1953 |
| 2,689,269 | Bradley | Sept. 14, 1954 |
| 2,708,725 | Hensel | May 17, 1955 |
| 2,740,913 | Majkrzak | Apr. 3, 1956 |
| 2,742,522 | Law | Apr. 17, 1956 |
| 2,744,952 | Lawrence | May 8, 1956 |
| 2,771,503 | Schwartz | Nov. 20, 1956 |
| 2,785,221 | Carpenter | Mar. 12, 1957 |
| 2,837,687 | Thompson | June 3, 1958 |